United States Patent
Caleffi

(10) Patent No.: US 8,327,867 B2
(45) Date of Patent: Dec. 11, 2012

(54) ANTIFREEZING VALVE DEVICE FOR HYDRAULIC AND/OR WATER STORAGE SYSTEMS

(75) Inventor: Marco Caleffi, Borgomanero (IT)

(73) Assignee: Caleffi S.p.A., Novara (IT)

(*) Notice: Subject to any disclaimer, the term of this patent is extended or adjusted under 35 U.S.C. 154(b) by 526 days.

(21) Appl. No.: 12/609,321

(22) Filed: Oct. 30, 2009

(65) Prior Publication Data

US 2010/0108152 A1  May 6, 2010

(30) Foreign Application Priority Data

Oct. 30, 2008  (IT) ............... MI2008A1921

(51) Int. Cl.
*F16K 17/36* (2006.01)
(52) U.S. Cl. ............................. 137/62; 137/79
(58) Field of Classification Search ............ 137/62, 137/79, 90, 80; 251/337
See application file for complete search history.

(56) References Cited

U.S. PATENT DOCUMENTS

| | | | |
|---|---|---|---|
| 3,729,023 A * | 4/1973 | Hammond | 137/614.03 |
| 4,066,090 A | 1/1978 | Nakajima et al. | |
| 4,207,916 A * | 6/1980 | Hayes | 137/171 |
| 4,460,007 A * | 7/1984 | Pirkle | 137/79 |
| 6,374,849 B1 | 4/2002 | Howell | |
| 7,407,113 B2 * | 8/2008 | Guterman | 137/62 |

FOREIGN PATENT DOCUMENTS

| | | |
|---|---|---|
| DE | 3126213 A1 | 1/1983 |
| FR | 2609520 A1 | 7/1988 |
| GB | 1236186 A | 6/1971 |
| JP | 59103087 A | 6/1984 |

OTHER PUBLICATIONS

Italian Search Report in corresponding application n. MI20081921 dated Nov. 23, 2009.
European Search Report in corresponding application EP 09012742 dated Nov. 11, 2009.

* cited by examiner

*Primary Examiner* — Kevin Lee
(74) *Attorney, Agent, or Firm* — Young & Thompson

(57) ABSTRACT

An antifreezing valve device for hydraulic and/or water storage systems includes a valve body having a water inlet and outlet which open into a chamber housing a linear thermostatic actuator, and a closing member operatively connected to the thermostatic actuator to be moved from a closed position for closing a sealing seat for ambient temperatures equivalent to or higher than a preset value, to an open position for discharging water from a system for lower ambient temperatures; the closing member is conformed with a cup-shaped support element sealingly slidable along the cylindrical body of the actuator, in order to define with this a closed chamber into which extends the actuator control rod. The device also includes first and second biasing spring members acting at opposite ends of the housing chamber on the closing member, respectively on the linear actuator, and guide element for sliding of the linear actuator and of the closing member.

16 Claims, 3 Drawing Sheets

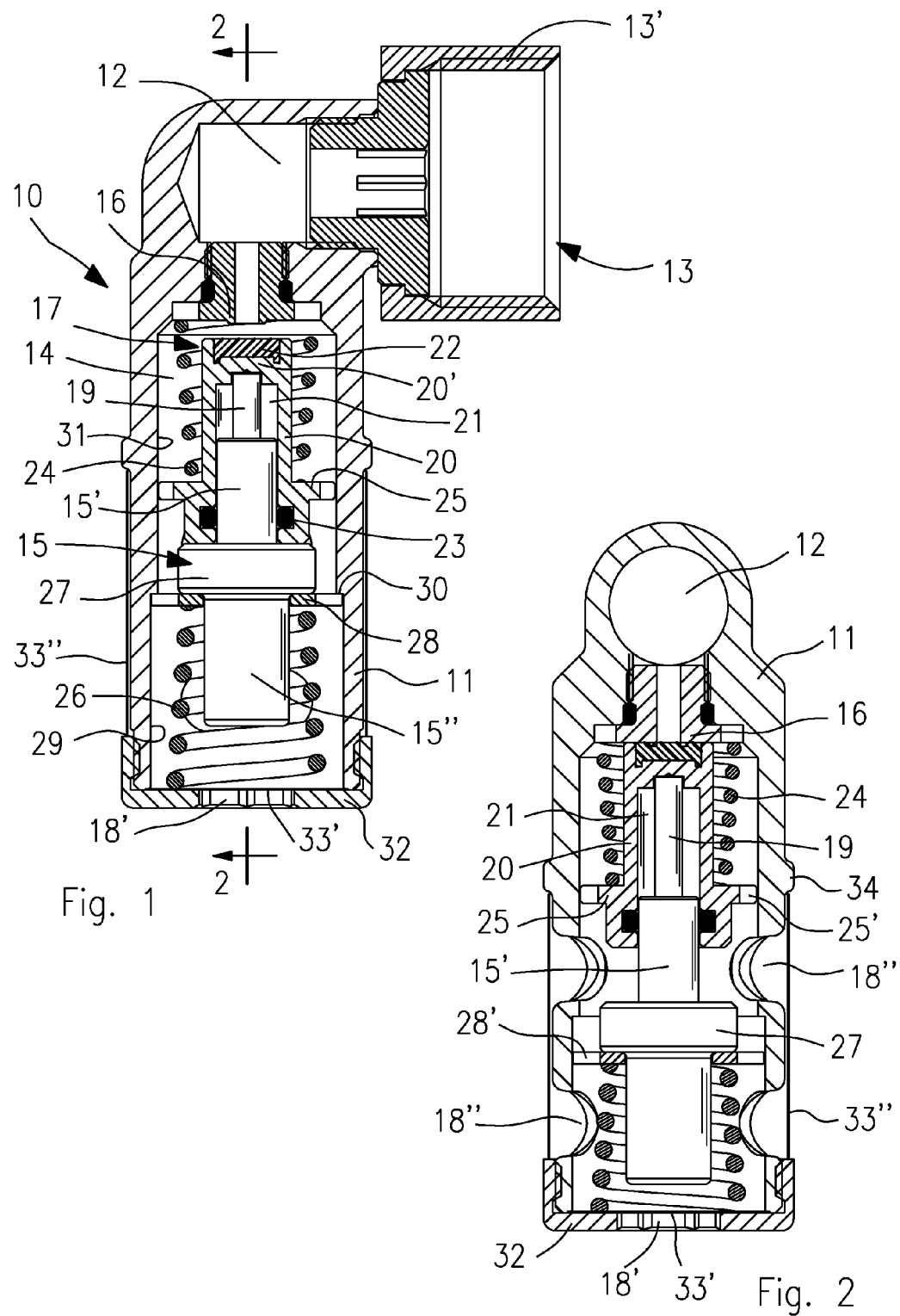

ANTIFREEZING VALVE DEVICE FOR HYDRAULIC AND/OR WATER STORAGE SYSTEMS

BACKGROUND OF THE INVENTION

This invention concerns an antifreezing valve device for hydraulic and/or water storage systems, particularly suitable for preventing freezing of water in storage systems of solar panels, in pipes, plants or valve devices for gardening and irrigation, in hydraulic plants of cold stores for food products, or, however in any hydraulic system exposed to freezing in which, due to potability requirements, it is not possible to add antifreeze to liquids to the water.

STATE OF THE ART

In general, the use of antifreezing valves is known to protect hydraulic and/or water storage systems from damages caused by the cold, the valves being conformed in such a way that, when the atmospheric temperature drops below a preset value, they allow the water in the system to flow or to be discharged, thereby preventing the formation of ice which could cause breakage or cracks of the system itself.

Traditionally, an antifreezing valve of this kind comprises an extended valve body which has a water inlet, connectable to a hydraulic and/or water storage system, and a water outlet, which open into an internal chamber for housing a linear thermostatic actuator.

The thermostatic actuator, which is slidably supported in the housing chamber to be moved by a movable control rod of the same actuator in contrast with a first and a second coaxially arranged biasing springs, actuates a closing member in such a way as to move it from a closed position of the valve body inlet, maintained for ambient temperatures equivalent to or higher than a preset value, to an open position for lower ambient temperatures, in which it discharges water.

However, these traditional antifreezing valves have reliability problems over time, mainly related to the formation of encrustations and deposits on the actuator control rod and to the entry of dirt into the internal chamber of the valve body through the water outlet openings, with a consequent change in the intervention threshold of the valve, and with the possibility at worst that the valve could become blocked.

Also, from a constructional viewpoint, the configuration of the thermostatic actuator and the relative contrast springs in these traditional anti-freezing valves involves to adopt a valve body formed by several parts in order to allow the assembling of the same valves, such a solution however entailing higher production and assembly costs.

Lastly, the coaxial positioning of the biasing springs involves high radial dimensions of the valve body, with consequent limitations in relation to the installation possibilities of the valve.

Furthermore, with particular reference to plants for gardening and irrigation, one or more delivering cocks are conventionally provided for delivering water, which, together with the relevant pipes, can be damaged when the ambient temperature goes down under 0° C., due to the freezing of the water remaining therein.

Therefore a further need exists to suitably arrange an antifreezing valve in such gardening and irrigation plants in order to protect both the delivering cocks and the relevant pipes from the risk of freezing.

OBJECTS OF THE INVENTION

The main object of this invention is to provide an antifreezing valve device for hydraulic and/or water storage systems, which is constructionally simple and easy to assemble, and which has a high degree of reliability over time, being essentially free from incrustation and dirt problems both on the thermostatic actuator control rod and in its housing chamber.

Another object is to provide an antifreezing valve device according to the invention suitably associated with a fluid flow stop or adjusting valve device conformed in such a way as to prevent freezing of water in the same stop or adjusting valve device and in the pipes to which it is connectable, when ambient temperatures are equivalent or lower than a preset value.

BRIEF DESCRIPTION OF THE INVENTION

The above may be achieved by an antifreezing valve device for hydraulic and/or water storage systems, comprising:

a valve body having a water inlet, connectable to a hydraulic and/or water storage system, the water inlet opening into an internal housing chamber for housing a linear thermostatic actuator through a sealing seat, said valve body having at least one water outlet from said housing chamber;

a linear thermostatic actuator movably supported in said housing chamber, said actuator having a cylindrical body from which a movable control rod extends; and a closing member operatively connected to said thermostatic actuator, to be moved from a closed position for closing said sealing seat for ambient temperatures equivalent to or higher than a preset value, to an open and water discharging position for lower ambient temperatures, wherein the closing member is conformed with a cup-shaped support element sealingly slidable along the cylindrical body of the actuator, said cup-shaped element defining, with the actuator body, a closed chamber into which the actuator control rod extends to act against a bottom wall of the same cup-shaped element, wherein first biasing spring means are provided between one end of the housing chamber and the closing member, and second biasing spring means are provided between a second opposite end of the housing chamber and the linear actuator, and wherein guide means are provided for the linear actuator, respectively for the closing member, axially sliding along internal walls of the housing chamber of the valve body.

BRIEF DESCRIPTION OF THE DRAWINGS

These and further characteristics according to this invention will be more clearly evident from the following description, with reference to the accompanying figures, in which:

FIG. 1 is longitudinal cross-sectional view of the antifreezing valve device according to this invention, with the closing member in the open position;

FIG. 2 is a further longitudinal cross-sectional view of the valve device in FIG. 1, according to line 2-2, with the closing member in a closed position;

DETAILED DESCRIPTION OF THE INVENTION

Figure 3:
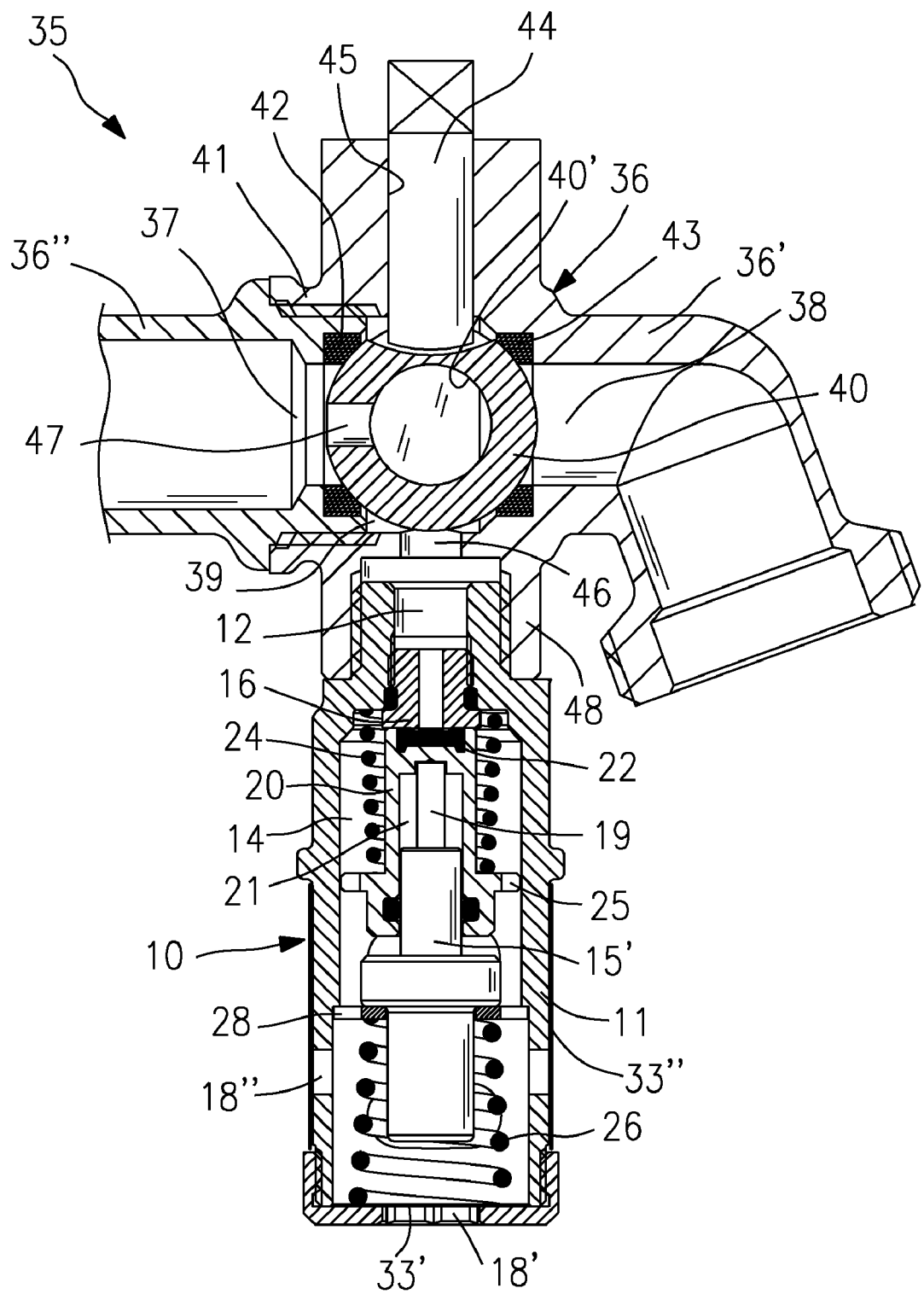
FIG. 3 is a cross-sectional view of an antifreezing valve device according to this invention applied to a fluid flow stop or adjusting valve device of a first type.

The general characteristics of this invention will be shown below through several examples.

FIGS. 1 and 2 show an antifreezing valve device according to this invention, which is particularly suitable for installation on water storage systems of solar panels, or on water tanks in general, on pipes for gardening and irrigation, on hydraulic systems of cold stores for food products, or on any other hydraulic system exposed to freezing which is connected to the water system and under pressure, in order to prevent freezing of the is water within them.

The valve device, indicated as a whole with reference number 10, comprises a valve body 11 extending along a longitudinal axis, the valve body 11 having at a first front end a water inlet 12 connectable to a hydraulic and/or water storage system, not shown, by a suitable connector 13; in particular, in the exemplificative embodiment of FIG. 1, the water inlet 12 is in the form of a side opening at the aforementioned first end of the valve body 11, from which a connector 13 radially extends, the connector 13 comprising a threaded connecting ring 13' internally supported in order to be angularly rotatable and orientable according to its own axis.

The inlet 12 opens into an internal housing chamber 14 inside valve body 11, in which a linear thermostatic actuator 15 is arranged, such as a wax type actuator; the inlet 12 and the housing chamber 14 are connected to each other through an annular sealing seat 16 for a closing member 17 actuated by the linear actuator 15, as explained below.

As better illustrated in FIG. 2, the valve body 11 also has at least a water outlet opening for the outlet of water from the housing chamber 14, for example an axial opening 18' at a rear end of valve body 11 opposite to the inlet 12 and a series of side openings 18" along the same valve body 11, such openings also allowing the thermostatic actuator 15 to be exposed to the temperature of the ambient air.

The thermostatic actuator 15, which, as specified further on, is movably supported in the housing chamber 14 by suitable guide means, has a cylindrical body 15', and a movable control rod 19 extending from one end of the body 15', the movable rod 19 being controlled by a temperature-sensitive wax bulb 15" arranged at the opposite end of the body 15' of actuator 15 itself.

The aforementioned closing member 17 is operatively connected to the thermostatic actuator 15 to be moved from an advanced closed position for closing the sealing seat 16 for ambient temperatures equivalent to or higher than a preset value, for example 4° C., to a retracted open position for discharging water for lower ambient temperatures, in order to prevent freezing of the water present in the system connected to the anti-freezing valve device 10.

In particular, when the preset value of the ambient temperature is reached, the closing member 17 is brought into the open position, allowing the water present in the pipe or in the tank to flow out; if, as normally happens, the discharged water is at a temperature higher than the ambient air, when it laps against the thermostatic actuator 15, it causes the closing member 17 to reclose, stopping the flow and exposing again the actuator 15 to the temperature of the ambient air.

Therefore, as long as the temperature of the discharged water remains higher than the temperature of the ambient air, there is a sequence of openings and reclosings of the member 17, which limits the amount of water wasted while still guaranteeing antifreeze protection of the system; if, on the other hand, the temperature of the discharge water and the ambient air are similar, the closing member 17 remains open, therefore discharging a constant flow of water which prevents freezing of the water upstream.

According to this invention, the closing member 17 is conformed with a cup-shaped support element 20 sealingly sliding along the cylindrical body 15' of actuator 15, in such a way as to define with the body 15' of the actuator 15 a closed chamber 21 into which the control rod 19 of actuator 15 extends, thereby being protected from incrustations and dirt.

In particular, the cup-shaped element 20 is slidable coaxially to the cylindrical body 15' and to the rod 19 of actuator 15, the rod 19 extending into the closed chamber 21 to an extent allowing the same rod to act against a bottom wall 20' of the cup-shaped element 20 itself, the bottom wall 20' having a disc gasket 22 for sealingly closing the annular seat 16.

In order to form the necessary seal on the cylindrical body 15' of actuator 15, the cup-shaped element 20 has an internal annular gasket 23 positioned in a suitable annular housing slot.

The aforementioned advantageous configuration of the closing member 17 and the linear actuator 15 is also possible thanks to a new arrangement of the necessary biasing spring means for the closing member 17 and the actuator 15 itself; in particular, the valve device 10 according to this invention comprises first biasing spring means, for example in the form of a first helical contrast spring 24, positioned between a first front end of housing chamber 14 and a first annular shoulder 25 of the cup-shaped element 20 of the closing member 17, and second biasing spring means, for example in the form of a second extra-stroke helical spring 26, between the second opposite rear end of the housing chamber 14 and a second annular shoulder of the linear actuator 15, consisting of an enlarged body part 27 of the actuator itself.

The biasing spring means 24, 26 according to such configuration is have limited radial dimensions which allow both to have sufficient space inside the valve body 11 for the aforementioned closed chamber 21 for the control rod 19, and also to have a valve body 11 of reduced radial dimensions, with consequent benefits in terms of installation possibilities; also, since first spring 24 acts directly on the closing member 17, biasing it to open, the danger of blocking of the closing member 17 itself, typical of traditional devices, is avoided.

The valve device 10 according to this invention also comprises, as said, guide means for the linear actuator 15, for example in the form of a guide ring 28, which is inserted onto the sensitive bulb 15" and held against the enlarged body part 27 by the action of the second biasing spring 26; this guide ring 28 has a peripheral edge conformed to axially slide along a first cylindrical wall 29 internally extending into the housing chamber 14, at the rear part of the valve body 11, the wall 29 ending on a front side with an annular stop surface 30 for the ring 28.

The valve device 10 also comprises guide means for the closing member 17, for example defined by the annular shoulder 25 of the cup-shaped element 20, which has a peripheral edge conformed to axially sliding along a second cylindrical wall 31 internally extending into the housing chamber 14 at the front part of valve body 11.

In order to allow passage of the water between the inlet 12 and the outlets 18', 18", the guide ring 28 and the annular shoulder 25 have respective passage openings 28' and 25', for example provided along their peripheral edge, as indicated in FIG. 2.

In order to allow simplification of construction and assembly of the device, the valve body 11 is preferentially formed in a single piece, for example by hot forming of brass, providing at a rear end an axial opening which may be reclosed by a suitable lid 32, attachable by screwing on or in another appropriate manner, in order to allow introduction of the actuator 15 and the closing member 17 inside the valve body 11 itself; in this case, the axial outlet 18' for the water is created on the lid 32.

Also, in order to prevent dirt and deposits from entering inside the chamber 14 of valve body 11, which could hinder the sliding movement of the thermostatic actuator 15 and of the closing member 17, the device 10 according to this invention preferentially comprises suitable protection nets 33', 33", for example in metal material, at the outlet openings 18', 18" for the water, thereby achieving a high level of reliability over time.

In particular, in the embodiment shown, the protection net 33' for the axial opening 18' is in the form of a disc-shaped net 33' inside lid 32, whereas the protection net 33" for the side openings 18" is in the form of a tubular net 33" inserted externally on valve body 11 and held in position between the lid 32 and a shoulder part 34 on the valve body itself 11.

With reference to the mentioned problem of protecting gardening and irrigation plants from the risk of water freezing, in FIG. 3, in which the same reference numbers have been used to indicate equivalent or similar parts, an antifreezing valve device according to this invention is illustrated, suitably applied to a fluid flow stop or adjusting valve device of a first type, for example in the form of a ball cock.

The ball cock, indicated as a whole with reference number 35, comprises a hollow body 36 having an inlet 37 and an outlet 38 for fluid is which open into an internal chamber 39 for housing a fluid flow stop and/or adjusting valve member, in this case in the form of a ball closing member 40, having an axial hole 40' for passage of the fluid, as explained further on.

The hollow body 36 is preferentially formed of a first and a second body part 36', 36", connectable with each other through appropriate connecting means, in such a way as to make easy the assembly of the cock itself; in particular, the first body part 36' is conformed to have a cavity inside defining the housing chamber 39, which is open on one side towards the fluid outlet 38, and on the opposite side towards a connector 41, internally threaded for connection of the second body part 36", tubular in shape, which defines the fluid inlet 37.

Inside the housing chamber 39, there are a first and a second sealing annular seats 42, 43 for the ball closing member 40, which are provided on separate sealing rings, axially aligned with each other on opposite sides of the chamber 39 at the inlet 37, respectively the outlet 38 for the water.

The ball closing member 40, which is positioned between these sealing seats 42, 43 to be movably supported, has a rotatable control rod 44 perpendicular to the axial hole 40' of the closing member 15, the rod sealingly extending outside the hollow body 36 through a hole 45 of the first body part 36', in a manner to be connected to a control knob, not shown, for the closing member.

In particular, since the control rod 44 is sealingly inserted in the hole 45 with the possibility of rotating around its own axis, the closing is member 40 is angularly movable according to the axis of control rod 44, to be rotated between a first angular open position, in which the passage hole 40' in the closing member 40 is axially aligned with inlet 37 and outlet 38, and a second angular closing position, rotated of 90° with respect to the previous one, in which the closing member 40 closes the flow, by interacting with the sealing seat 43 towards the fluid outlet 38.

In order to protect the ball cock from the risk of freezing, the housing chamber 39 of the closing member 40 has a fluid discharge opening 46 communicating with the outside through a thermostatic anti-freeze valve 10 according to the invention, the features of which are described above, in a manner to cause discharge and/or flow towards the outside of the water remaining in the housing chamber 39 and upstream of it, when the cock 35 is closed, for ambient temperatures lower than a preset value, for example 4° C.

Preferentially, the discharge opening 46 is made in the first body part 36' on a lower side of the housing chamber 39 opposite to the control rod 44, in a manner to allow, in the case of low ambient temperatures, an efficient flow towards the outside of the water present in chamber 39 itself and in the axial hole 40', which, in the closing position of the closing member 40, is freely communicating with the housing chamber 39.

In order to allow the water present upstream to the housing chamber 39 to flow and be discharged in the case of low ambient temperatures, with particular reference to the water present at the inlet 37, in the second body part 36", and in the pipes, not shown, to which cock 35 is connectable, the ball closing member 40 includes a through connecting opening 47 which, in the closing position of the closing member 40, extends transversally between an internal side wall of axial hole 40' and the external surface of closing member 40 facing towards the inlet 37, thereby placing in communication the zone of inlet 37 with the axial hole 40' in the closing member 40 and therefore with the discharge opening 46.

Preferentially, the first body part 36' at the discharge opening 46 has a threaded connector 48 for connection of the thermostatic anti-freeze valve 10; it is possible for the body of the anti-freeze valve to be manufactured as a single piece with the body 36 of the cock 35.

From the above, it is clear that the ball cock 35 provided with the anti-freeze valve 10 according to the invention allows efficient flowing and/or discharge of the water present in the cock itself, and also in the pipes to which it is connected, when the closed cock is exposed to ambient temperatures close to or lower than 0° C., thereby preventing freezing of the water.

Figure 4:
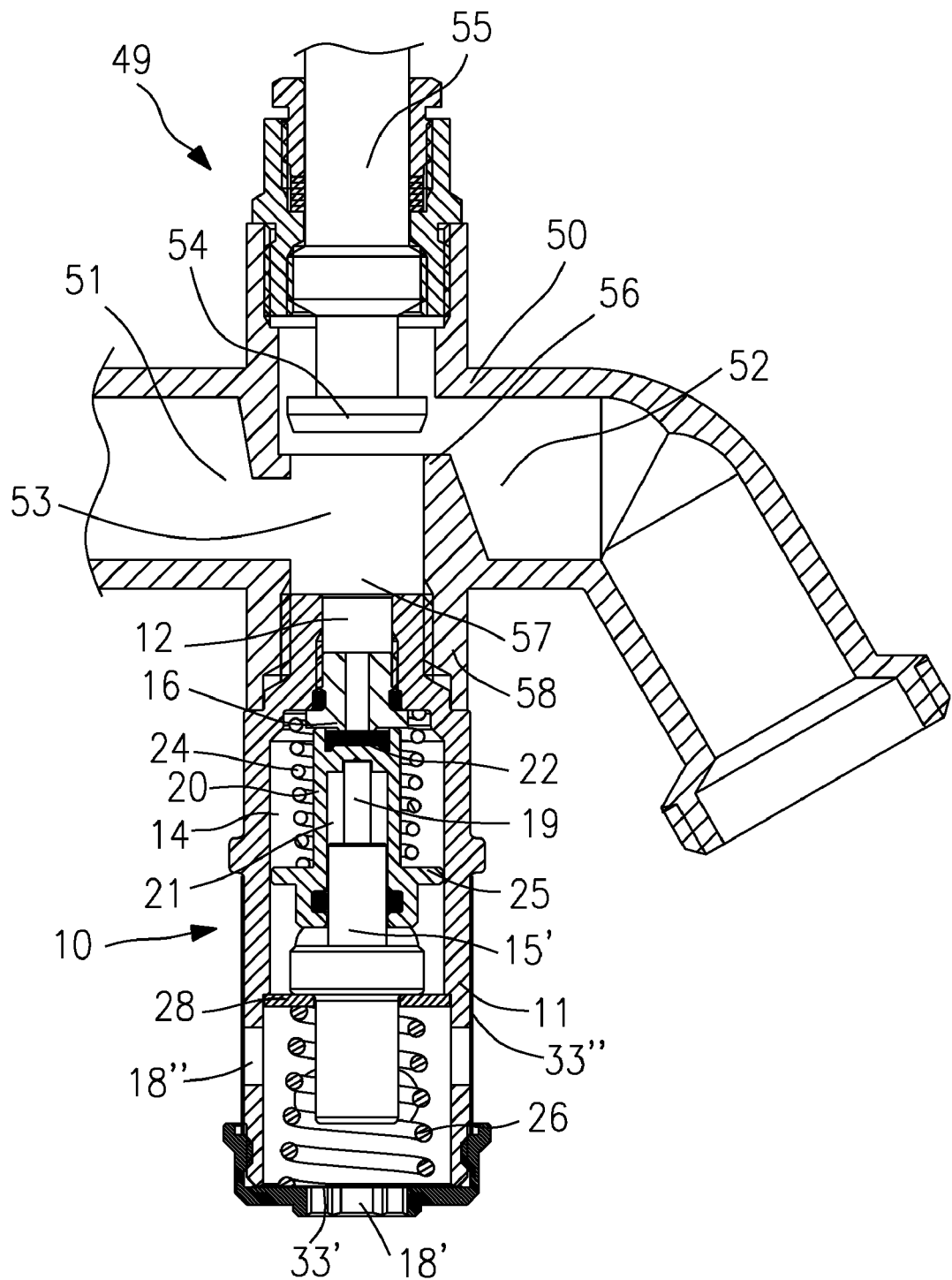
FIG. 4 is a cross-sectional view of an antifreezing valve device according to this invention applied to a fluid flow stop or adjusting valve device of a second type.

In FIG. 4, in which the same reference numbers have been used to indicate equivalent or similar parts, an antifreezing valve device according to this invention is illustrated, suitably applied to a second type of fluid flow stop or adjusting valve device, for example in the form of a cock having a disk shaped closing member.

The disk cock, indicated as a whole with reference number 49, comprises a hollow body 50 having an inlet 51 and an outlet 52 for fluid which open into an internal chamber 53 for housing a fluid flow stop and/or adjusting valve member, in this case in the form of a disk shaped closing member 54, which is axially movable by a rotatable control rod 55 is to interact with an annular sealing seat 56, coaxially arranged to the disk closing member 54.

In order to protect the disk cock 49 and the relevant pipes upstream to the same cock from the risk of freezing, the housing chamber 53 for the closing member 54 has a fluid discharge opening 57 provided at the bottom part of the body 50, the opening 57 communicating with the outside through a thermostatic anti-freeze valve 10 according to the invention.

Preferentially, the hollow body 50 at the discharge opening 57 has a threaded connector 58 for connection of the thermostatic anti-freeze valve 10.

What is stated and shown with reference to the accompanying drawings has been provided simply by way of example and to illustrate the general characteristics of the invention and also preferential embodiments; therefore, other modifications and variations to the antifreezing valve for hydraulic and/or water storage systems are possible, without thereby deviating from the claims.

The invention claimed is:

1. An antifreezing valve device for hydraulic and/or water storage systems, comprising:
   a hollow valve body (11) comprised of a peripheral wall that encloses a chamber (14), a first end of the valve body (11) having an inlet (12) in communication with the chamber (14), a second end of the of the valve body (11) having an outlet (18') in communication with the chamber (14), the peripheral wall of the valve body extending between the first end and the second end and comprising air inlet apertures (18") that penetrate therethrough such that the chamber (14) is in fluid communication with air surrounding the valve body (11) and such that the thermostatic actuator (15) is exposed to said surrounding air;
   a thermostatic actuator (15) located inside the chamber (14);
   a valving member (17) operatively connected to and movably supported by the thermostatic actuator (15) to axially slide inside the chamber (14);
   an annular sealing valve seat (16) located at an interface between the chamber (14) and the inlet (12), the valve seat being configured to receive the valving member (17) thereby to close the valve seat (16), the valve seat (16) being normally closed by said valving member (17);
   a first biasing spring (24) between a surface at an upper side of the chamber (14) and a surface of the valving member, the first biasing spring (24) configured to urge the valving member (17) away from the valve seat (16);
   a second biasing spring (26) between the thermostatic actuator and a surface at the bottom side of the chamber (14), the second biasing spring (26) configured to urge the valving member (20) toward the valve seat (16),
   wherein the thermostatic actuator (15) is configured, in a first mode in which the thermostatic actuator is exposed to an air temperature higher than a predetermined value, to extend against the first biasing spring and to cause the valving member (17) to press against the valve seat (16) to close the valve seat and prevent fluid flow from the inlet (12) into the chamber (14), and
   wherein the thermostatic actuator (15) is further configured, in a second mode in which the thermostatic actuator is exposed to an air temperature lower than the predetermined value, to retract the valving member (17) from the valve seat (16) and thereby to open the valve seat (16) and permit fluid flow from the inlet (12) into the chamber (14) and to the outlet (18).

2. The antifreezing valve device according to claim 1,
   wherein the thermostatic actuator comprises a cylindrical body and a movable control rod extending therefrom, and
   wherein the valving member comprises a cup-shaped element with an open end and an opposite closed end, the cylindrical body of the thermostatic actuator slidably fitted to the cup-shaped element at the open end and the control rod of the thermostatic actuator extending within an interior of the cup-shaped element to the closed end.

3. The antifreezing valve device according to claim 1, wherein the inlet includes a threaded connector angularly rotatable about an axis through a center of said inlet.

4. The antifreezing valve device according to claim 2, wherein the cup-shaped element further comprises an annular shoulder extending from an outer surface of the cup-shaped element, said annular shoulder having a peripheral edge configured to axially slide along an inner-facing surface of said peripheral wall,
   the annular shoulder including openings configured to permit passage of fluid therethrough.

5. The antifreezing valve device according to claim 4, wherein the thermostatic actuator further comprises an annular shoulder extending from an outer surface of the thermostatic actuator,
   wherein the first biasing spring acts upon the surface at the upper side of the chamber and the annular shoulder of the cup-shaped element, and
   wherein the second biasing spring consists of an extra-stroke helical spring acts upon the surface at the bottom side of the chamber and the annular shoulder of the thermostatic actuator.

6. The antifreezing valve device according to claim 2, wherein the cup-shaped element is internally provided with a seat for an annular sealing gasket for sealing upon said cylindrical body of the thermostatic actuator.

7. The antifreezing valve device according to claim 1, wherein the thermostatic actuator comprises a guide ring extending annularly from an outer surface of the thermostatic actuator, a peripheral edge extending to an inner-facing wall of the chamber and configured to slide axially along the inner-facing wall of the chamber,
   said guide ring having openings configured to permit passage of fluid therethrough.

8. The antifreezing valve device according to claim 1, further comprising:
   a protective net extending across an opening of one or more of the air inlet apertures.

9. The antifreezing valve device according to claim 1, further comprising:
   a disc-shaped first protective net covering an opening of the outlet; and
   a tubular second protective net covering respective openings of the air inlet apertures.

10. A fluid flow stop or adjusting valve device, comprising:
    a thermostatic antifreezing valve device according to claim 1;
    a hollow body having an internal chamber, and a fluid inlet and a fluid outlet each opening into the internal chamber; and
    a fluid flow stop or adjusting valve member, enclosed within the internal chamber and movably supported in said internal chamber, the fluid flow stop or adjusting valve member shaped to correspond with a sealing member located towards the fluid outlet,
    wherein said internal chamber has a fluid discharge opening in fluid communication with the thermostatic antifreezing valve device, said thermostatic antifreezing valve device configured to cause fluid discharge and/or flow of fluid remaining in and upstream of the housing chamber toward the outlet of the thermostatic antifreezing valve device when an ambient fluid temperature exposed to the thermostatic actuator is lower than the predetermined value.

11. The fluid flow stop or adjusting valve device according to claim 10, wherein said fluid discharge opening is arranged on a lower side of the internal chamber.

12. The fluid flow stop or adjusting valve device according to claim 10, further comprising:
    a ball closing member interposed between annular sealing members positioned in the internal chamber respectively at the fluid inlet and the fluid outlet,
    said ball closing member having an axial passage hole for fluid passage and a through connection opening which, in a closed position of the ball closing member, extends transversally between an internal wall of said axial passage hole and an external surface of the valving member of the thermostatic antifreezing valve device facing towards the inlet of the valve body.

13. The fluid flow stop or adjusting valve device according to claim 12, wherein the ball closing member is angularly movable between a first angular open position, in which the axial passage hole into the ball closing member is axially aligned with the fluid inlet and the fluid outlet, and a second angular closing position, rotated 90° with respect to the first angular open position and in which the ball closing member closes against the sealing member at the outlet and in which the fluid inlet is in fluid connection with the fluid discharge opening in communication with the thermostatic antifreezing valve device.

14. The fluid flow stop or adjusting valve device according to claim 10, wherein the valve body has a threaded connector configured to connect the thermostatic antifreezing valve to the discharge opening.

15. An antifreezing valve device for hydraulic and/or water storage systems, comprising:
- a valve body (11) having a water inlet connectable to a hydraulic and/or water storage system, the water inlet opening into an internal housing chamber (14) enclosed by a peripheral wall of the valve body (11), said valve (11) body also having a water outlet from said housing chamber;
- an annular sealing seat (16) located at an interface between the chamber (14) and the inlet (12);
- a linear thermostatic actuator (15) movably supported inside said housing chamber (14), said thermostatic actuator having a cylindrical body (15') from which a movable control rod (19) extends; and
- a closing member (17) operatively connected to said thermostatic actuator (15), movable from a closed position for closing said sealing seat (16) for ambient temperatures equivalent to or higher than a preset value, to an open and water discharging position for lower ambient temperatures,
- wherein the closing member (17) is fitted within a cup-shaped element (20) sealingly slidable along the cylindrical body (15') of the thermostatic actuator (15), said cup-shaped element (20) defining, together with the cylindrical body (15'), a closed chamber (21) into which the control rod (19) extends to act against a wall of the cup-shaped element (20),
- wherein a first spring element (24) is provided between one end of the housing chamber (14) and the closing member (17), and a second biasing spring element (26) is provided between a second opposite end of the housing chamber (14) and the thermostatic actuator (15), and
- wherein guide means are provided configured for guiding the thermostatic actuator (15) along a longitudinal direction within the housing chamber (14), comprising a guide ring located on the thermostatic actuator (15) comprising a peripheral edge configured to slide axially along a cylindrical wall inside the housing chamber (14), said guide ring having openings configured to permit passage of water therethrough.

16. An antifreezing valve device for hydraulic and/or water storage systems, comprising:
- a valve body (11) having a water inlet connectable to a hydraulic and/or water storage system, the water inlet opening into an internal housing chamber (14) enclosed by a peripheral wall of the valve body (11), said valve (11) body also having a water outlet from said housing chamber comprised of an axial opening at an end of the valve body (11) opposite to that of the water inlet;
- an annular sealing seat (16) located at an interface between the chamber (14) and the inlet (12);
- a linear thermostatic actuator (15) movably supported inside said housing chamber (14), said thermostatic actuator having a cylindrical body (15') from which a movable control rod (19) extends; and
- a closing member (17) operatively connected to said thermostatic actuator (15), movable from a closed position for closing said sealing seat (16) for ambient temperatures equivalent to or higher than a preset value, to an open and water discharging position for lower ambient temperatures,
- wherein the closing member (17) is fitted within a cup-shaped element (20) sealingly slidable along the cylindrical body (15') of the thermostatic actuator (15), said cup-shaped element (20) defining, together with the cylindrical body (15'), a closed chamber (21) into which the control rod (19) extends to act against a wall of the cup-shaped element (20),
- wherein a first spring element (24) is provided between one end of the housing chamber (14) and the closing member (17), and a second biasing spring element (26) is provided between a second opposite end of the housing chamber (14) and the thermostatic actuator (15),
- wherein a disc-shaped protective net (33') is located at the axial opening of the water outlet,
- wherein the valve body (11) has a plurality of side openings (18") penetrating though the peripheral wall of the valve body valve body (11), and
- wherein a tubular protective net (33") is located on the peripheral wall of the valve body (11) for protecting the side openings (18").

\* \* \* \* \*